United States Patent [19]

Butler et al.

[11] Patent Number: 5,754,627
[45] Date of Patent: May 19, 1998

[54] METHOD AND APPARATUS FOR MANAGING CALLS USING A SOFT CALL PARK

[75] Inventors: Chris Butler, Kanata; Michael Branchaud, Ottawa; Debbie Pinard, Kanata, all of Canada

[73] Assignee: Mitel Corporation, Canada

[21] Appl. No.: 474,369

[22] Filed: Jun. 7, 1995

(Under 37 CFR 1.47)

[51] Int. Cl.$^6$ .............................. H04Q 3/64; H04M 3/42
[52] U.S. Cl. .................... 379/63; 379/58; 379/67; 379/88; 379/211; 379/266
[58] Field of Search ............................ 379/67, 88, 89, 379/70, 142, 162, 210, 211, 212, 213, 214, 265, 266, 207, 56, 57, 58, 59, 60, 96, 63

[56] References Cited

U.S. PATENT DOCUMENTS

| | | | |
|---|---|---|---|
| 3,943,290 | 3/1976 | Golden | 379/84 |
| 4,661,975 | 4/1987 | Brecher | 379/215 |
| 5,006,983 | 4/1991 | Wayne et al. | 379/266 |
| 5,117,449 | 5/1992 | Metroka et al. | 379/58 |
| 5,260,993 | 11/1993 | Breeden et al. | 379/266 |
| 5,276,731 | 1/1994 | Arbel et al. | 379/142 |
| 5,327,486 | 7/1994 | Wolff et al. | 379/214 |
| 5,327,490 | 7/1994 | Cave | 379/266 |
| 5,329,578 | 7/1994 | Brennan et al. | 379/89 |
| 5,434,906 | 7/1995 | Robinson et al. | 379/67 |
| 5,434,908 | 7/1995 | Klein | 379/67 |
| 5,442,689 | 8/1995 | Buttita et al. | 379/211 |
| 5,467,385 | 11/1995 | Reuben et al. | 379/67 |
| 5,481,602 | 1/1996 | Griffiths et al. | 379/211 |
| 5,509,062 | 4/1996 | Carlsen | 379/211 |
| 5,524,147 | 6/1996 | Bean | 379/211 |
| 5,533,102 | 7/1996 | Robinson et al. | 379/96 |
| 5,537,470 | 7/1996 | Lee | 379/266 |
| 5,548,636 | 8/1996 | Bannister et al. | 379/211 |

FOREIGN PATENT DOCUMENTS

| | | | |
|---|---|---|---|
| 23512/88 | 4/1989 | Australia | H04M 1/64 |
| 434239 A2 | 6/1991 | European Pat. Off. | H04M 3/42 |
| 4-367196 | 12/1992 | Japan | H04Q 3/58 |
| 2049358 | 12/1980 | United Kingdom | H04M 1/64 |

*Primary Examiner*—Krista M. Zele
*Assistant Examiner*—Scott Wolinsky
*Attorney, Agent, or Firm*—Schwegman, Lundberg, Woessner & Kluth, P.A.

[57] ABSTRACT

A user initiated soft call park with recorded voice comfort notification system for use within a telephony server for wired or wireless telephones. In response to receiving an incoming call, a user depresses a function key on his or her telephone set. The telephony server responds to depression of the user's function key by placing the incoming call on soft hold and generating a recorded message for indicating to the calling party that the call will be answered shortly.

4 Claims, 5 Drawing Sheets

METHOD AND APPARATUS FOR MANAGING CALLS USING A SOFT CALL PARK

FIELD OF THE INVENTION

This invention relates in general to communication systems, and more particularly to a user activated system for placing an incoming call on soft hold and providing recorded voice comfort notification to the calling party.

BACKGROUND OF THE INVENTION

Special features for incoming call forwarding are well known in modern communication systems such as PABX's, central office switching systems, etc. According to the prior art Call Forwarding Busy/No Answer feature an incoming call to a telephone user can be automatically forwarded to a voice answering system, to another extension, to an outside line, etc., in response to the telephone of the called party being busy or remaining unanswered after a predetermined number of rings.

There are many situations in which a user does not wish to be interrupted by ringing of his or her telephone set. For example, when a user is in a meeting, and an important call arrives, immediate interruption of the meeting to answer the user's telephone set can be disruptive. Similarly, when a user is concentrating on a particular task (eg. on-line database or communications access via personal computer and modem), the user may find immediate interruption of the task to be disruptive. However, in these circumstances, the user may still wish to answer the call if it is important, and to prevent the call from being automatically forwarded to a voice answering system, to a further extension, etc.

According to the prior art Call Forwarding Busy/No Answer feature, if the incoming call is not answered within a predetermined number of rings the call will be automatically forwarded. This has the disadvantage of wasting the time of both the called party and the calling party who are unable to complete the call, which can be annoying to both the called and calling parties.

SUMMARY OF THE INVENTION

According to the present invention, a system is provided for allowing telephone users to manage interruptions caused by incoming telephone calls in an effective manner, thereby enhancing call management. More particularly, upon being notified of an incoming call (i.e. via the user's telephone set ringing, visual display or lamp illuminating, etc.), the called party is provided with means for acknowledging receipt of the incoming call (e.g. by depressing a function key on the telephone set), resulting in the incoming call being placed on "soft" hold and the generation of a comfort notification message advising the calling party that the called party will answer the incoming call shortly. After acknowledging receipt of the incoming call, the called party can then interrupt the meeting or task at hand in a non-disruptive manner (e.g. the user may leave the meeting room, go off-line from their computer, etc.), and then retrieve the call from hold.

BRIEF DESCRIPTION OF THE DRAWINGS

A detailed description of the present invention is provided herein below with reference to the following drawings, in which.

DETAILED DESCRIPTION OF THE PREFERRED EMBODIMENT

As discussed above, the system according to the present invention utilizes speech generation in conjunction with a temporary or "soft" hold, to allow users of wired or wireless telephones to effectively manage incoming calls. In the event of an incoming call, the called party is provided with the option (while the set is ringing) of placing the call into a special soft "call park" queue by means of a programmable function key or some other action. Once the call has been placed in the queue, the calling party is provided with a pre-recorded announcement in the voice of the called party to effect that the person called will answer the call momentarily. The called party can then retrieve the call at any time by going off hook, pressing "SEND" on a wireless set, etc.

According to one scenario, a user may be participating in a meeting. When an incoming call is received, the user's wireless handset rings or vibrates in a well known manner. A calling line ID may be displayed on the user's handset which may indicate to the user that the incoming call is important. The user can then press a special button (e.g. function key) on the handset for directing the call to the special soft "call park" queue. A speech generator then informs the caller (in the voice of the user) that the user will be with them in just a moment. Meanwhile, the user informs the meeting group that he or she needs to take the call and leaves the room. Once outside of the meeting room, the user can go off-hook on the handset (eg. press "SEND") in order to retrieve the important call.

According to another contemplated scenario, a meeting may be in progress in a user's office. The user's telephone in that office will ring in response to an incoming call. The calling line ID may indicate that the incoming call is important. In this scenario, the user can press a special button (e.g. programmable key) on the telephone for directing the call to the aforementioned soft "call park" queue. A speech generator then informs the caller (in the voice of the user) that the user will be with them in just a moment. Meanwhile, the user finishes the conversation in his or her office and then goes off-hook on the telephone to retrieve the call, or presses a button on the telephone for retrieving the call.

Figure 1:
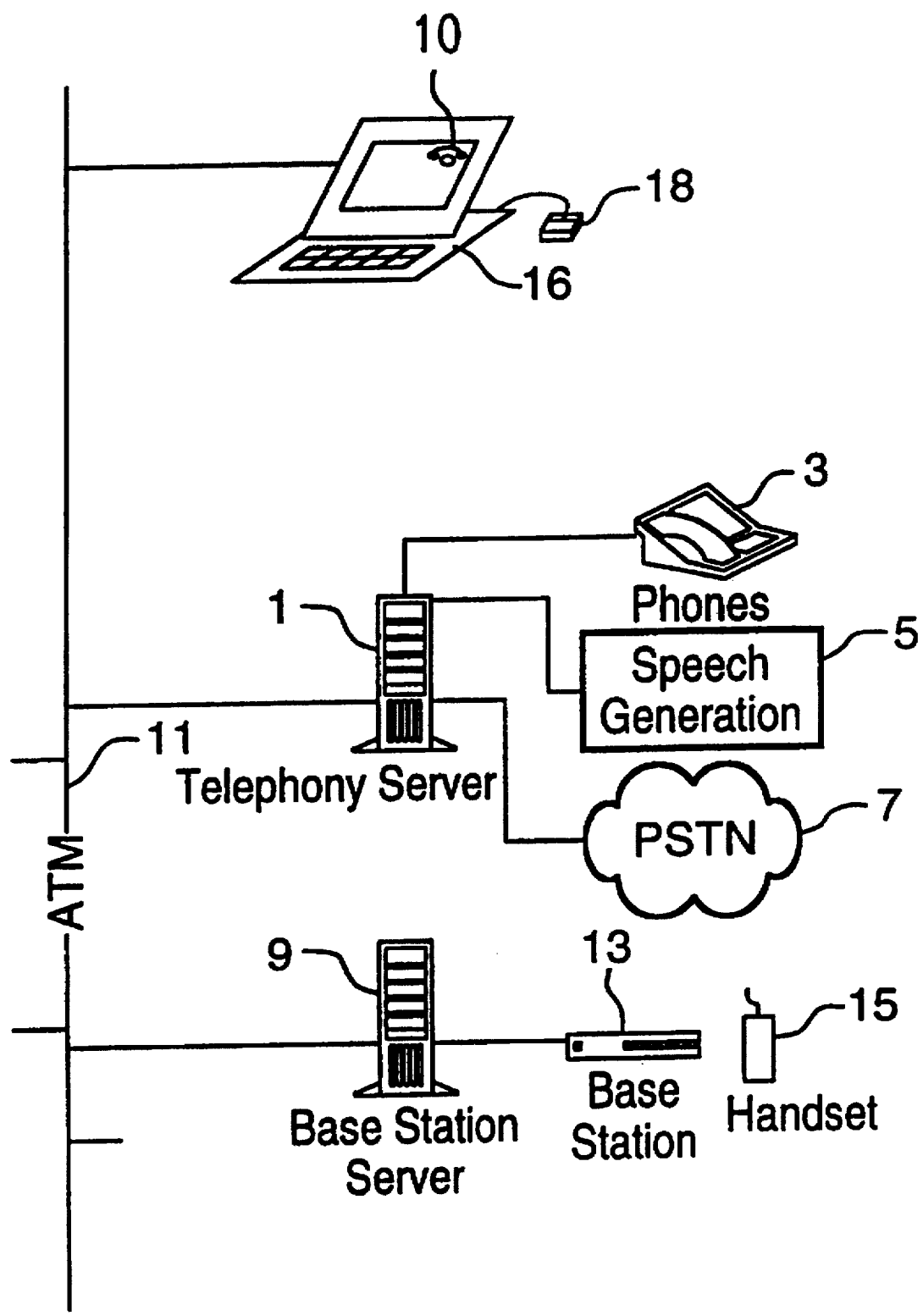
FIG. 1 is a block diagram of a communication system for implementing the system of the present invention.

Turning now to FIG. 1, a communication system is shown for implementing the system of the present invention. A telephony server 1 provides line, trunk and speech generation services via a plurality of telephones 3, speech generation apparatus 5, and PSTN 7 (Public Switched Telephone Network), respectively, in a well known manner.

The telephony server communicates with a base station server 9 via an ATM network 11 (or a LAN and Voice Network, or other comparable communication means). The base station server 9 provides mobility management and base station services via one or more base stations 13 in communication with one or more mobile phones 15, in a well known manner.

Additional communication and data processing equipment may also be connected to the ATM network, such as a personal computer (PC) 16 and mouse 18.

Figure 2:
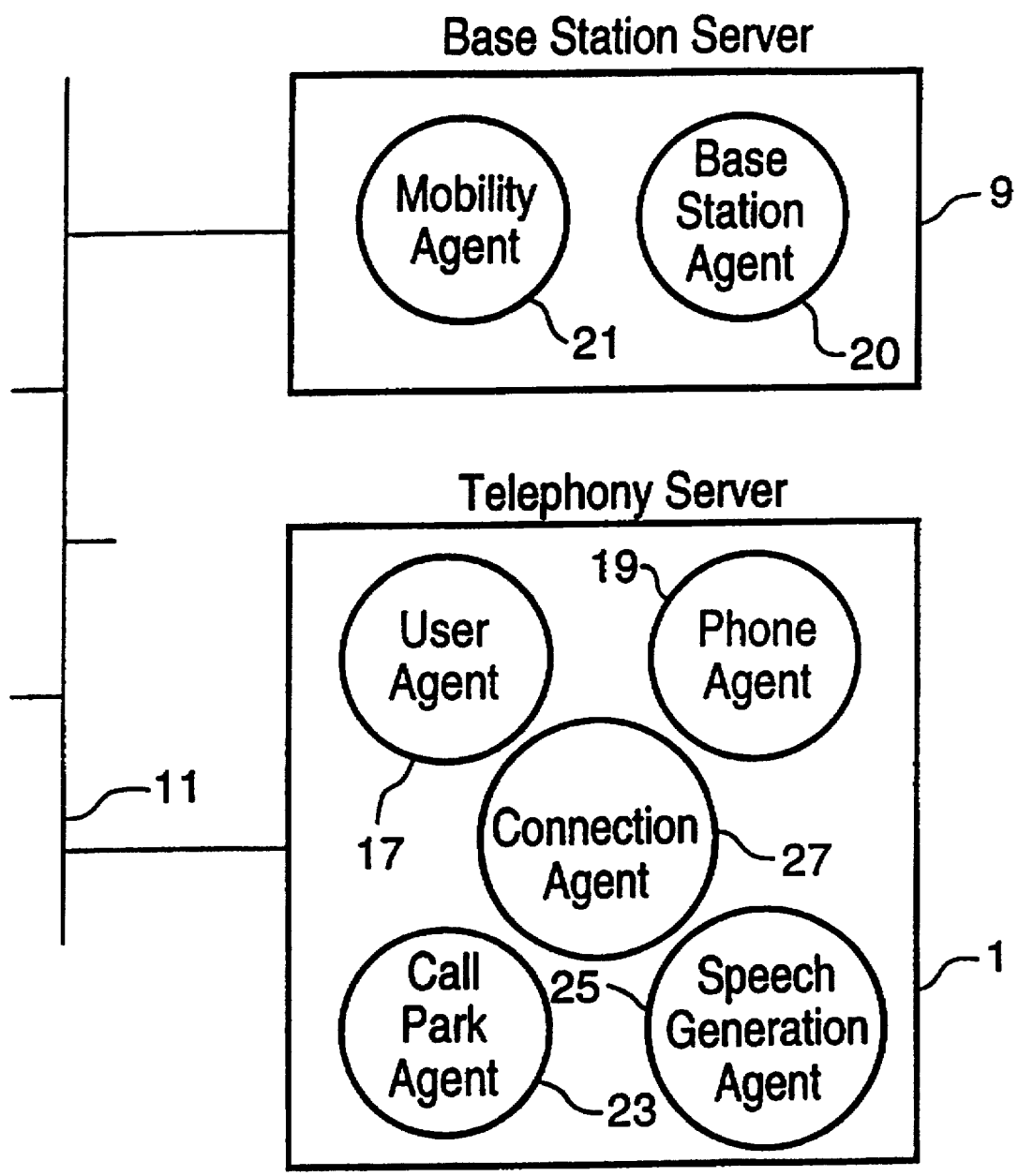
FIG. 2 is a block diagram showing agents residing in a telephony server and a base station server of the system shown in FIG. 1.

With reference to FIG. 2, a plurality of agents are provided within the telephony server for handling users, phones, speech generation services, connection (including switching) and call park. In the present application, the term "agent" will be understood to mean a process running in the operating system of a server, wherein the agent is a proxy (i.e. representation) of a device or person (e.g. for a person, the agent has knowledge concerning the user's preferences, etc.).

Figure 3:
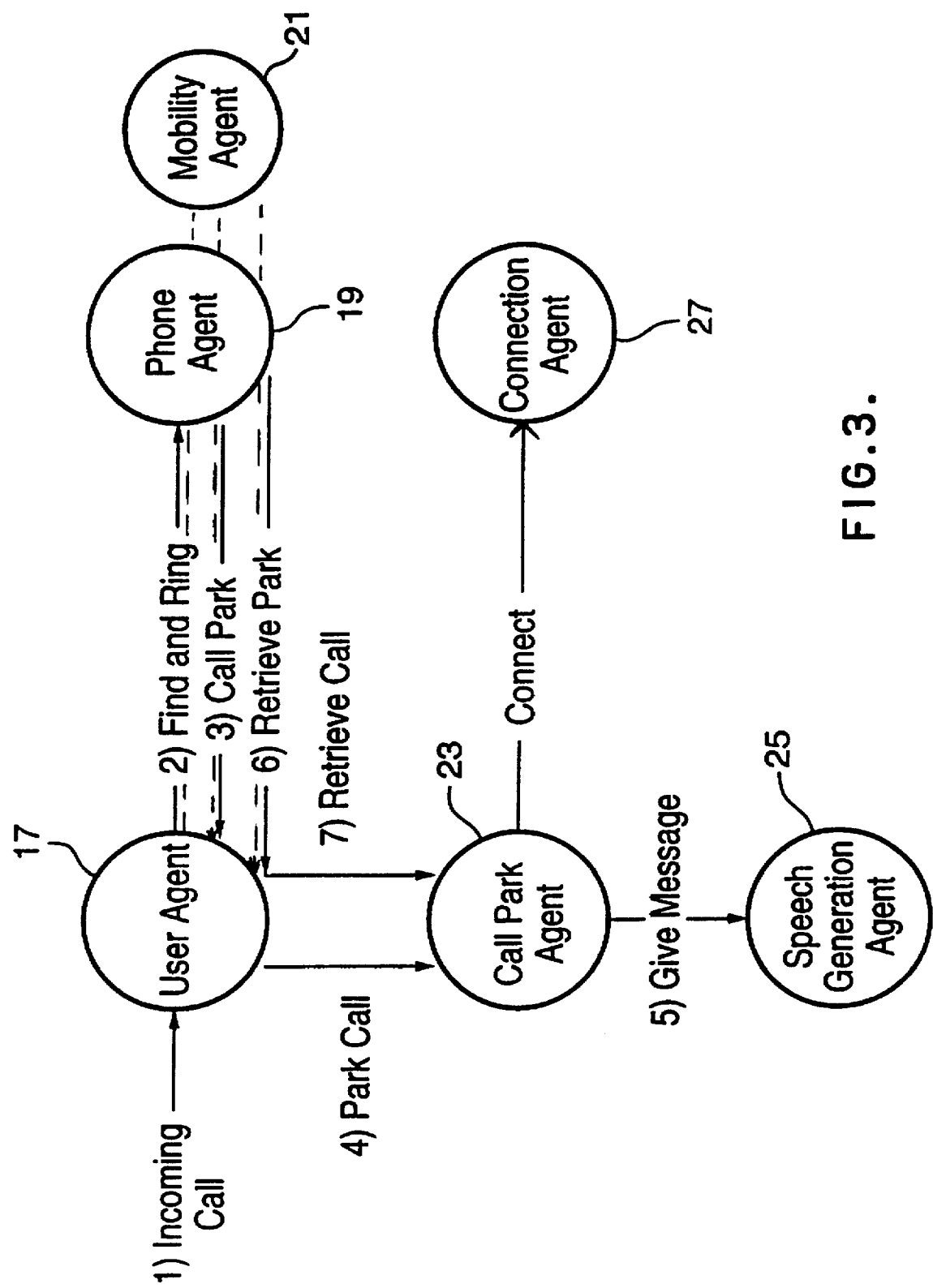
FIG. 3 shows the transmission of messages between agents in the telephony server and base station server of FIG. 2.

In operation, when an incoming call arrives from the PSTN 7, or another telephone, the telephony server 1 informs user agent 17 via an "Incoming Call" message as shown in FIG. 3. The user agent 17 then decides whether to ring a normal phone associated with the user or to ring a mobile phone, or both. In response to this decision, the user agent 17 generates a "Find and Ring" message which is sent to one or both of a phone agent 19 associated with one or both of telephone 3 and PC 16, and a mobility agent 21 associated with mobile telephone 15. In FIG. 3, phone agent 19 is illustrated. However, phone agent 19 may be replaced by mobility agent 21 for mobile phone operations. The generation of a "Find and Ring" message causes ringing of the associated telephone 3 or mobile telephone 15 (via a link through base station agent 20), as well as display of the caller ID or caller name using well known CIDCW (Caller ID on Call Waiting) service. In addition to the visual display on telephone 3, an icon 10 may be caused to flash on the personal computer 16.

The user can then elect to depress a special key on the telephone 3, or a predetermined function key on handset 15, or click on the icon 10 using mouse 18, or issue a voice command for recognition by a speech recognition program running on PC 16, resulting in generation of a "Call Park" message by the phone agent 19 (or mobility agent 21 as the case may be). The user agent 17 receives the "Call Park" message and in response generates a "Park Call" message containing the caller ID and message to be played to the calling party. The "Park Call" message is directed by user agent 17 to call park agent 23 which in response queues the incoming call, and sends a "Give Message" instruction to speech generation agent 25 to play the message to the calling party.

Furthermore, where the calling party is a personal computer (e.g. PC 16), the call park agent 23 may cause a message to be transmitted to the PC via ATM network 11 for causing display of a text message to the calling party.

When the called party indicates that they want to retrieve the parked call (i.e. by going off-hook, pressing a line access button, click on icon displayed on a PC, etc.), phone agent 19 (or mobility agent 21, as the case may be) generates a "Retrieve Park" message for receipt by user agent 17. User agent 17 then generates a "Retrieve Call" message, which is passed on to the call park agent 23. Call park agent 23 then generates a "connect message" for transmission to connection agent 27, which then connects the two parties together for communication.

Figure 4:
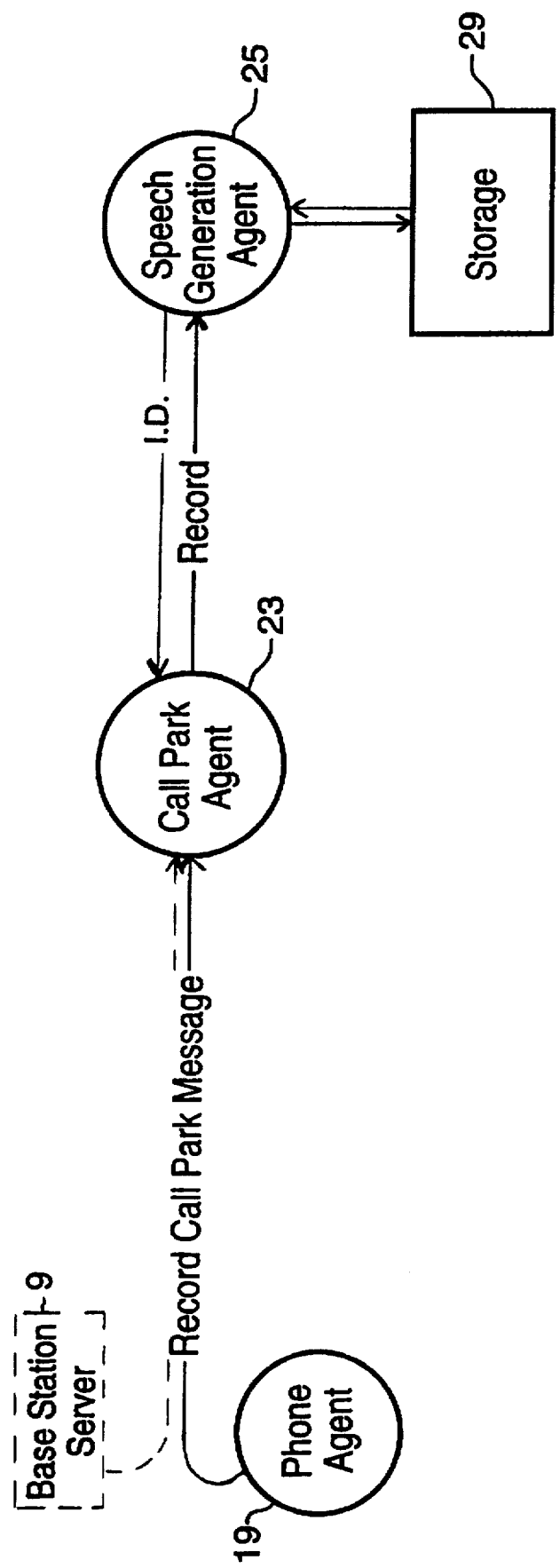
FIG. 4 is a block diagram showing the transmission of messages between agents in the telephony server of FIG. 2, for implementing the recording of messages to be played to incoming callers.

In order to record a message to be given to incoming callers, the user depresses a button (e.g. function key or "soft" programmable key, etc.) on his or her associated telephone 3 or mobile handset 15, which causes the phone agent 19 (or mobility agent 21, as the case may be) to generate a "Record Call Park Message". As shown in FIG. 4, the "Record Call Park Message" is transmitted to call park agent 23 which in response generates a "Record" message for reception by speech generation agent 25. Speech generation agent 25 accesses internal memory storage 29 in which the recorded messages are stored. The user speaks his or her message, and then hangs up. This causes the speech generation agent 25 to file the message, give it an ID, and pass the ID back to the call park agent 23. Call park agent 23 then stores the message ID against the user's ID. Thus, when a particular user wants to initiate the call park feature, call park agent 23 utilizes the user ID to access the particular message ID for identifying the message in memory storage 29.

Figure 5:
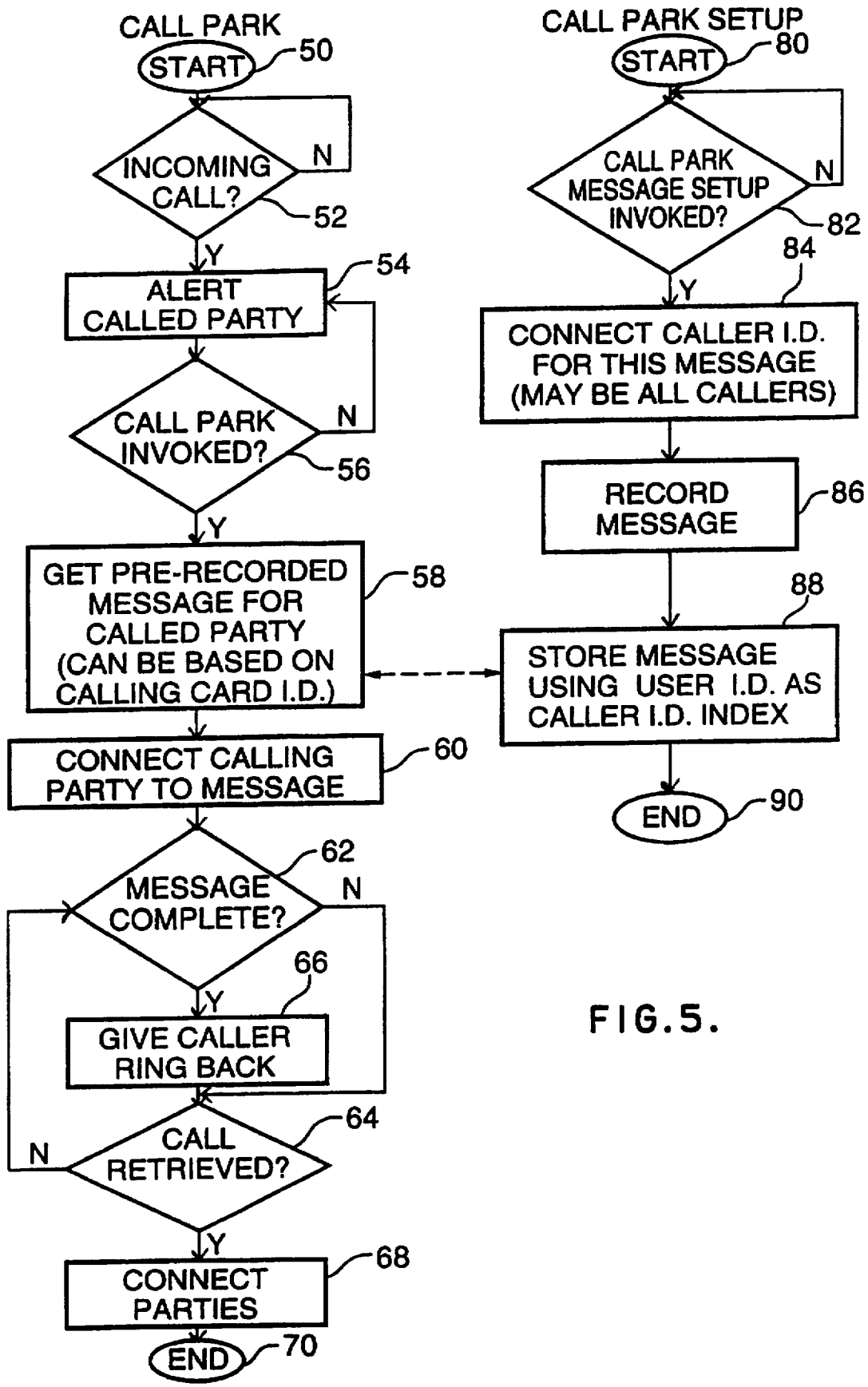
FIG. 5 is a flow chart showing the sequence of steps for implementing soft call park and call park set up according to the preferred embodiment.

Turning now to FIG. 5, the call park and call park set up sequences are shown in greater detail.

Turning first to the call park sequence, the process flow begins at step 50 (START). A determination is made as to whether or not there is an incoming call (step 52). If there is no incoming call, program flow returns for re-executing step 52. If there is an incoming call, the user agent 17 and phone agent 19 (or base station agent 20 and mobility agent 21) alert the called party (step 54). If call park is invoked by the phone agent 19 (or base station agent 20 and mobility agent 21), as determined at step 56, then the pre-recorded message is retrieved from memory storage 29 (step 58). The calling party is then connected to receive the message via call park agent 23 and speech generation agent 25 (step 60). A determination is then made as to whether or not the complete message has been delivered to the calling party (step 62). If the message is not yet complete, then a determination is made as to whether the call has been retrieved by the called party (step 64). If the complete message has been delivered, then the calling party is provided with ring back tone (step 66) via user agent 17, and program flow proceeds to step 64. If, at step 64, the call has not yet been retrieved, then program flow returns to step 62. If, at step 64, it is determined that the call has been retrieved, then the calling and called parties are connected via connection agent 27 (step 68), and the program flow ends (i.e. return from interrupt to step 50).

For call park set up, program flow begins at step 80 (start). First, a determination is made as to whether the user has invoked call park message set up (FIG. 4), as shown at step 82. If call park message set up has not been invoked, then program flow re-executes step 82. If call park message has been invoked by the user, then the caller ID is connected to a particular message (the caller ID can be for all callers or for selective incoming callers), as shown at step 84. Next, the message is recorded (step 86), and the message is stored in memory storage 29 (step 88) using the user ID and caller ID as indexes within the memory storage 29. The program flow ends at step 90 with a return from interrupt.

A person understanding the present invention may conceive of other embodiments and variations thereof. For example, all calls can be forwarded to the call park queue, and an indication may be given to each calling party, without requiring immediate action by the called party. This is useful for instance in an office scenario when a person knows that they are going to be working on a computer terminal, and wishes to have additional time to finish work, but does not want any calls to be lost. If a call is not retrieved within a certain time period, then the call is forwarded, but this time period is typically much longer than the normal forwarding time according to the preferred embodiment discussed above. As another alternative, the system may be programmed so that a user can set up his or her calls in such a fashion that the message is provided to the incoming caller at the same time that the caller's phone rings. In this case, the message should indicate that the called party is temporarily busy. This alternative embodiment can be usefully integrated to the use of a computer terminal, so that whenever a document is open on the computer terminal, the phone switches over to this alternative mode of operation automatically.

All such modifications and variations are believed to be within the sphere and scope of the claims appended hereto.

We claim:

1. A telephony server comprising:
   a) a user agent associated with a first user, for receiving an incoming call from a second user intended for said first user and in response generating a Find and Ring message to at least one of a telephone, a computer, and a mobile phone;
   b) at least one of a phone agent associated with said at least one of said telephone and said computer, and a mobility agent associated with said mobile phone, respectively, including means for receiving said Find and Ring message and in response ringing at least one of said telephone, computer, and mobile phone;
   c) means associated with said at least one of said telephone, computer and mobile phone for said first user to indicate acknowledgment of said incoming call to said at least one of said phone agent and mobility agent;
   d) means within said at least one of said phone agent and said mobility agent for generating a Call Park message to said user agent in response to said acknowledgment;
   e) means within said user agent for receiving said Call Park message and in response generating a Park Call message containing information data for said first user and a second user message to be played to said second user;
   f) a call park agent for receiving said Park Call message and in response queuing said incoming call and generating a Give Message instruction; and
   g) a speech generating agent for receiving said Give Message instruction and in response playing said second user message to said second user.

2. The telephony server of claim 1, further comprising:
   h) means associated with said at least one of said telephone, computer, and mobile phone for providing an indication that said first user wishes to answer said queued incoming call;
   i) means within said at least one of a phone agent and a mobility agent for generating a Retrieve Park message in response to said indication;
   j) means within said user agent for generating a Retrieve Call message in response to said Retrieve Park message;
   k) means within said call park agent for receiving said Retrieve Call message and in response generating a Connect message; and
   l) a connection agent for receiving said Connect message and in response establishing communication between said first user and said second user.

3. The telephony server of claim 1, further comprising:
   h) means within said at least one of said telephone, computer and mobile phone for generating a Record Call Park message for initiating recording of said message to be played to said second user;
   i) means within said call park agent for receiving said Record Call Park Message message and in response generating a Record message; and
   j) means with said speech generation agent for receiving said Record message and in response recording said message to be played to said second user by said first user and storing said message to be played to said second user for playback to said second user.

4. The telephony server of claim 1, further comprising means for associating different messages by said first user with different incoming callers.

* * * * *

UNITED STATES PATENT AND TRADEMARK OFFICE
CERTIFICATE OF CORRECTION

PATENT NO. : 5,754,627
DATED : May 19, 1998
INVENTOR(S) : Chris Butler et al.

It is certified that error appears in the above-identified patent and that said Letters Patent is hereby corrected as shown below:

At Col. 3, line 61, please delete "a "connect message" for" and insert --a "connect" message for--.

At Col. 4, line 43, please delete "step 80 (start)." and insert --step 80 (START).--.

Signed and Sealed this

Tenth Day of August, 1999

Attest:

Q. TODD DICKINSON

*Attesting Officer*   Acting Commissioner of Patents and Trademarks